E. A. G. Roulstone,
Street Sweeper.

No. 111,477.  Patented Jan. 31, 1871.

Witnesses,
P. E. Teschemacher
W. J. Cambridge

Inventor,
Edward A. G. Roulstone

E. A. G. Roulstone,
Street Sweeper.

No. 111,477. Patented Jan. 31, 1871.

Witnesses,

Inventor,
Edward A. G. Roulstone

United States Patent Office.

EDWARD A. G. ROULSTONE, OF BOSTON, MASSACHUSETTS.

Letters Patent No. 111,477, dated January 31, 1871.

IMPROVEMENT IN STREET-SWEEPING MACHINES.

The Schedule referred to in these Letters Patent and making part of the same.

*To all whom it may concern:*

Be it known that I, EDWARD A. G. ROULSTONE, of Boston, in the county of Suffolk and State of Massachusetts, have invented a Machine for Watering and Cleaning Streets, of which the following is a full, clear, and exact description, reference being had to the accompanying drawing making part of this specification, in which—

Figure 4 is a transverse vertical section, to be referred to.

Figure 5:
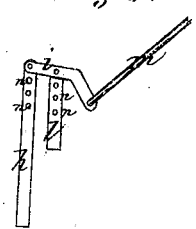

Figure 5, detail, to be referred to.

My invention consists in a ring or other device, which is thrown down onto the inner ends of the arms by a lever or shipper, to raise them from the ground, and, at the same time, to disconnect and arrest the revolution of the shaft which carries the arms.

To enable others skilled in the art to understand and use my invention, I will proceed to describe the manner in which I have carried it out.

In the said drawing—

A is the platform, covering a portion of a frame, A', mounted on wheels, B B C C.

To the inside or hub of one of the wheels C is secured a gear, D, which drives a smaller gear, E, on the outer end of a horizontal shaft, G, revolving in bearings, $a$, in the frame A'.

H is a bevel-gear, secured to the shaft G by a spline so that it will slide thereon, and is moved by a shipper-lever, I, in and out of gear with a bevel-pinion, K, on the top of a vertical shaft, L, revolving in bearings attached to the rear axle.

Secured to the lower end of the vertical shaft L is a circular plate, X, provided with open slots for the reception of the inner ends $b$ of a series of arms, M N, pivoted to projections, $d$, on the periphery of the plate X.

To the outer ends of the arms M are secured brushes, $e$, while the alternate arms N are provided with hoes, $f$.

Figure 1:
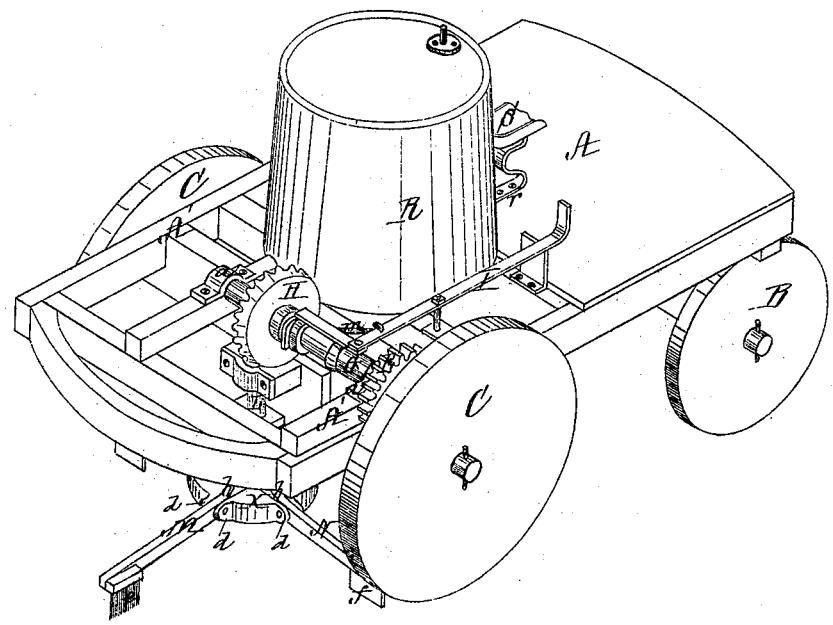
Figure 1 is a perspective view of my machine for watering and cleaning streets.
Figure 3:
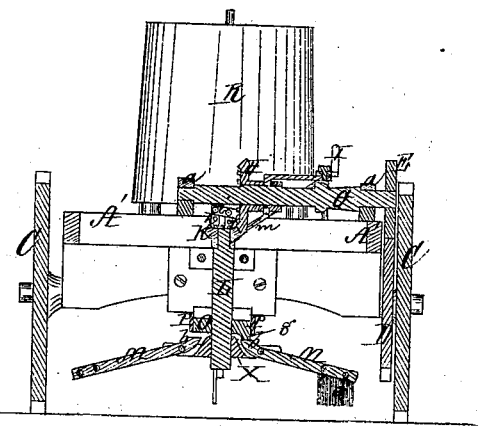
Figure 3 is a vertical section on the line $x\ x$ of fig. 2.
Figure 2:
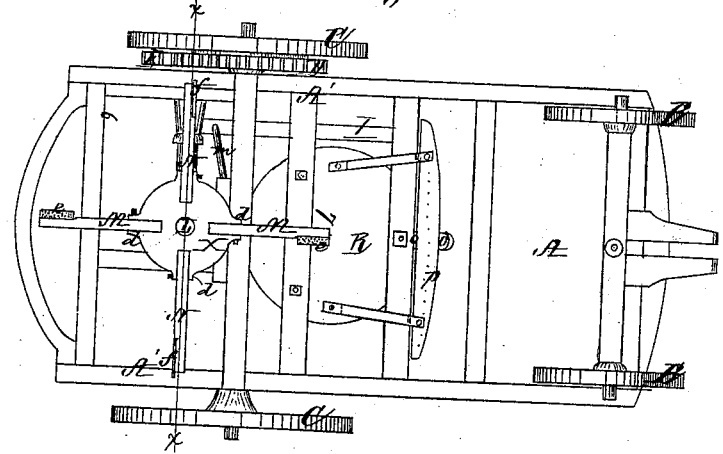
Figure 2 is a plan of the under side of the same.
Figure 4:
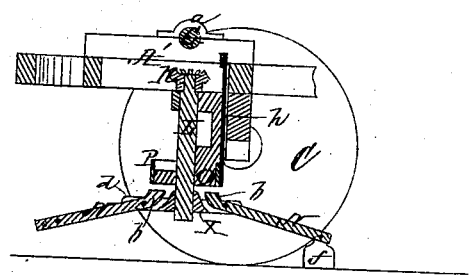

By loosely pivoting the arms M N, as above described, the brushes and hoes are allowed to fall and rest upon the ground while revolving till they arrive at a point, 6, fig. 2, when the inner end of the arm comes in contact with and passes under a lip or flange, $g$, projecting down from the under side of a circular block, O, secured to or forming a portion of the lower bearing of the vertical shaft L. The arm is thus raised, and its brush or hoe lifted and retained in that position off the ground until the inner end of the arm has passed off the under side of the lip $g$, which occurs when the brush or hoe arrives at the point 7, by which construction the dirt is deposited in winrows to the right of the center of the machine, as required.

The position of the lip $g$ may be changed so that the winrow will be formed under the center of the machine or on the left-hand side thereof.

P is a ring, which surrounds the circular block O, and is caused to move up and down thereon by means of a sliding bar, $h$, (see fig. 5,) attached thereto.

The upper end of this bar is pivoted to a bent lever, $i$, pivoted to a short post, $l$; and the opposite end of this lever $i$ is secured to one end of a rod, $m$, the other end of which is secured to the shipper-lever I, and thus, when the latter is moved to disconnect the bevel-wheel H from the pinion K to arrest the revolution of the arms M N, the ring is brought down on their inner ends so as to raise the brushes and hoes off the ground when not required for use.

The upper ends of the sliding bar $h$ and the post $l$ are provided with a series of holes, $n$, for the purpose of allowing the ring to be adjusted to the proper height.

R is a receptacle for holding water, placed upon the frame A', and provided with a discharge-pipe, $o$, communicating with a sprinkler, $p$, situated beneath the frame in advance of the path described by the revolution of the brushes and hoes, whereby the dust and dirt are watered before the brushes and hoes come in contact therewith.

The driver's seat S is secured to the platform at $r$.

Claim.

What I claim as my invention, and desire to secure by Letters Patent, is—

The ring P, operated by the sliding bar $h$, in combination with the arms M N pivoted to the revolving plate X, substantially as and for the purpose described.

Witness my hand this 30th day of November, A. D. 1870.

E. A. G. ROULSTONE.

Witnesses:
N. W. STEARNS,
W. J. CAMBRIDGE.